(12) United States Patent
Ishii et al.

(10) Patent No.: US 9,844,702 B2
(45) Date of Patent: *Dec. 19, 2017

(54) MULTI-LAYER GOLF BALL

(71) Applicant: Feng Tay Enterprises Co., Ltd., Douliou, Yunlin County OT (TW)

(72) Inventors: Hideyuki Ishii, Portland, OR (US); Nicholas A. Leech, Beaverton, OR (US); Nicholas Yontz, Portland, OR (US); Jun Ichinose, Kodaira Tokoyo (JP); Chien-Hsin Chou, Yun-lin Hsien (TW); Chen-Tai Liu, Yun-Lin Hsien (TW); Shih-Kai Lin, Yun-lin County (TW)

(73) Assignee: FENG TAY ENTERPRISES CO., LTD, Douliou, Yunlin County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,918

(22) Filed: Oct. 5, 2016

(65) Prior Publication Data

US 2017/0021233 A1 Jan. 26, 2017

Related U.S. Application Data

(63) Continuation of application No. 13/935,880, filed on Jul. 5, 2013, now Pat. No. 9,492,716.

(51) Int. Cl.
*A63B 37/04* (2006.01)
*A63B 37/12* (2006.01)
(Continued)

(52) U.S. Cl.
CPC ...... *A63B 37/0075* (2013.01); *A63B 37/0024* (2013.01); *A63B 37/0031* (2013.01); *A63B 37/0037* (2013.01); *A63B 37/0039* (2013.01);

*A63B 37/0043* (2013.01); *A63B 37/0045* (2013.01); *A63B 37/0059* (2013.01); *A63B 37/0062* (2013.01); *A63B 37/0064* (2013.01);
(Continued)

(58) Field of Classification Search
CPC .......................... A63B 37/0055; A63B 37/0051
USPC ........................................ 473/374, 376, 377
See application file for complete search history.

(56) References Cited

U.S. PATENT DOCUMENTS 2,938,237 A * 5/1960 Kern ..................... B29C 41/04
156/228
4,367,873 A * 1/1983 Chang .................... A63B 37/06
273/DIG. 4

(Continued)

*Primary Examiner* — Gene Kim
*Assistant Examiner* — Matthew B Stanczak
(74) *Attorney, Agent, or Firm* — Quinn IP Law

(57) ABSTRACT

A multi-layer golf ball includes a core, an intermediate layer surrounding the core, and a cover layer surrounding the intermediate layer. The core defines an outer surface that includes a plurality of polygonal land portions substantially aligned on a common sphere, which has a diameter of between 22 mm and 32 mm. The intermediate layer has a radially inward-facing surface that is flush with the outer surface of the core, and has a radial thickness of between 4 mm and 9 mm. The outer surface of the core defines a first set of annular grooves disposed about a first axis, and a second set of annular grooves disposed about a second axis. Each of the first and second set of annular grooves extend radially inward from the common sphere, and the first axis and the second axis are orthogonal.

13 Claims, 9 Drawing Sheets

(51) Int. Cl.
*A63B 37/00* (2006.01)
*C08L 13/00* (2006.01)
*C08L 9/00* (2006.01)
*C09D 133/02* (2006.01)
*C09D 175/04* (2006.01)

(52) U.S. Cl.
CPC ...... *A63B 37/0065* (2013.01); *A63B 37/0069* (2013.01); *A63B 37/0076* (2013.01); *A63B 37/0087* (2013.01); *A63B 37/0097* (2013.01); *C08L 9/00* (2013.01); *C08L 13/00* (2013.01); *C09D 133/02* (2013.01); *C09D 175/04* (2013.01)

(56) References Cited

U.S. PATENT DOCUMENTS

| | | | | |
|---|---|---|---|---|
| 5,556,342 A * | 9/1996 | Berberian | ........ | A63B 37/0098 473/125 |
| 5,836,834 A * | 11/1998 | Masutani | ........ | A63B 37/0097 473/374 |
| 5,935,022 A * | 8/1999 | Sugimoto | ........ | A63B 37/0003 473/373 |
| 5,984,807 A * | 11/1999 | Wai | ........ | A63B 37/0003 264/241 |
| 6,033,611 A * | 3/2000 | Yamaguchi | ........ | A63B 37/0097 264/250 |
| 6,124,389 A * | 9/2000 | Cavallaro | ........ | A63B 37/0003 473/373 |
| 6,648,776 B1 * | 11/2003 | Boehm | ........ | B29C 37/0082 264/250 |
| 6,846,249 B2 * | 1/2005 | Lacroix | ........ | A63B 37/0003 473/374 |
| 7,090,592 B2 * | 8/2006 | Watanabe | ........ | A63B 37/0003 473/373 |
| 8,905,863 B2 * | 12/2014 | Watanabe | ........ | A63B 37/0003 473/376 |
| 9,283,440 B2 * | 3/2016 | Ishii | ........ | A63B 37/0045 |
| 9,289,656 B2 * | 3/2016 | Ishii | ........ | A63B 37/0092 |
| 9,492,716 B2 * | 11/2016 | Ishii | ........ | C08L 9/00 |
| 2002/0086746 A1 * | 7/2002 | Bellinger | ........ | A63B 37/0003 473/374 |
| 2007/0161434 A1 * | 7/2007 | DuFaux | ........ | A63B 37/0003 473/371 |
| 2012/0115637 A1 * | 5/2012 | Ishii | ........ | A63B 37/0003 473/371 |
| 2015/0011334 A1 * | 1/2015 | Ishii | ........ | A63B 37/0076 473/376 |
| 2015/0018124 A1 * | 1/2015 | Ishii | ........ | C08L 9/00 473/373 |

* cited by examiner

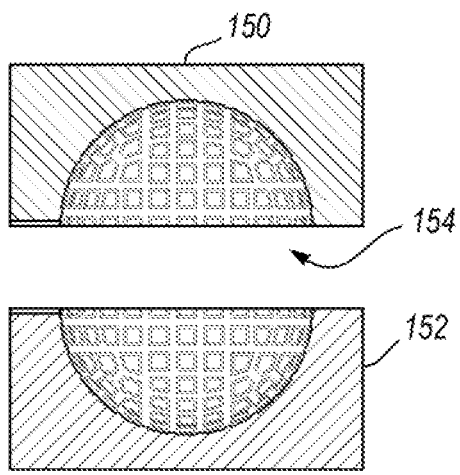
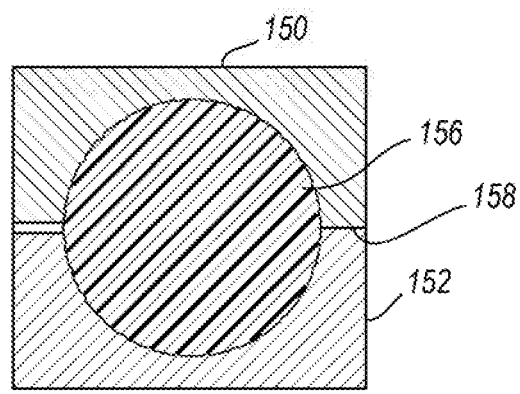
FIG. 17A  FIG. 17B
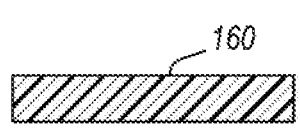
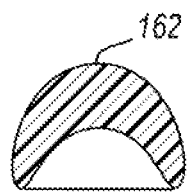
FIG. 18A  FIG. 18B
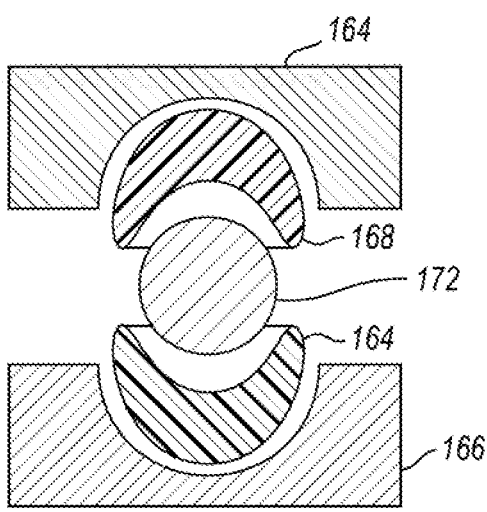
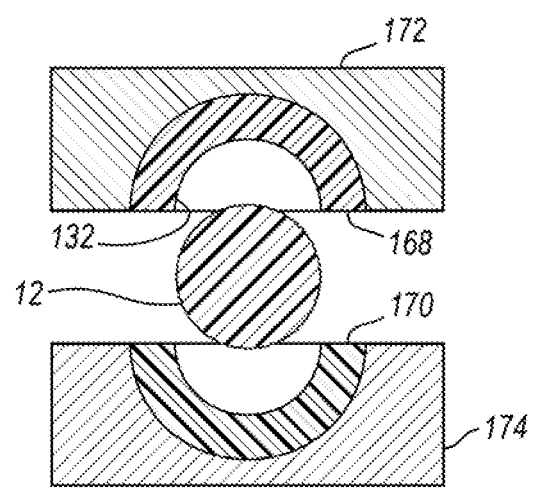
FIG. 18C  FIG. 18D

MULTI-LAYER GOLF BALL

CLAIM OF PRIORITY AND CROSS-REFERENCE TO RELATED APPLICATION

This application is a Continuation of U.S. patent application Ser. No. 13/935,880, which was filed on Jul. 5, 2013, and is incorporated herein by reference in its entirety for all purposes.

TECHNICAL FIELD

The present disclosure relates generally to multi-layer golf balls.

BACKGROUND

The game of golf is an increasingly popular sport at both the amateur and professional levels. To account for the wide variety of play styles and abilities, it is desirable to produce golf balls having different play characteristics.

Attempts have been made to balance a soft feel with good resilience in a multi-layer golf ball by giving the ball a hardness distribution across its respective layers (core, intermediate layer and cover) in such a way as to retain both properties. A harder golf ball will generally achieve greater distances, but less spin, and so will be better for drives but more difficult to control on shorter shorts. On the other hand, a softer ball will generally experience more spin, thus being easier to control, but will lack distance. Additionally, certain design characteristics may affect the "feel" of the ball when hit, as well as the durability of the ball.

SUMMARY

A multi-layer golf ball includes a core, an intermediate layer surrounding the core, and a cover layer surrounding the intermediate layer. The core may be formed from an ionomeric material and may have a hardness measured on the JIS-C scale of between 34 and 70. The core generally defines an outer surface that includes a plurality of polygonal land portions. The land portions are substantially aligned on a common sphere that has a diameter of between 22 mm and 32 mm.

The intermediate layer may be formed from a rubber, and may have a hardness measured on the Shore D scale of between 56 and 64. The intermediate layer has a radially inward-facing surface that is flush with the outer surface of the core, and has a radial thickness of between 4 mm and 9 mm. The rubber material forming the intermediate layer may include: a main rubber containing a polybutadiene; an unsaturated carboxylic acid and/or a metal salt thereof; and an organic peroxide. The cover may includes one or more of an ionomer resin, a polyethylene, and a polyester resin.

The outer surface of the core defines a first set of annular grooves disposed about a first axis, and a second set of annular grooves disposed about a second axis. Each of the first and second set of annular grooves extend radially inward from the common sphere, and the first axis and the second axis are orthogonal. Each groove of the first and second set of annular grooves has a depth measured in a radial direction relative to the common sphere, and a width measured in a tangential direction relative to the common sphere. In one configuration, each groove of the first and second set of annular grooves has a width/depth ratio of between 2 and 8.

Each groove of the first and second set of annular grooves may have a maximum depth of between 0.2 and 2.0 mm, though in other embodiments, each groove may have a maximum depth of between 0.15 mm and 1.0 mm, 0.15 mm and 0.8 mm, 0.15 mm and 0.5 mm, or 0.15 mm and 0.3 mm. Additionally, each groove may have a maximum depth that is substantially the same as the maximum depth of the other grooves.

The core and the intermediate layer may generally define an intermediate ball that has a 10-130 kg compression deformation of between 2.7 and 5.5 mm. The intermediate ball may further define a geometric center and a center of mass that are coincident. In one configuration, the intermediate layer may be bonded to the core across the entire outer surface of the core, such as using an ethylene vinyl acetate copolymer-based adhesive.

In one configuration, at least 50% of the polygonal land portions have a perimeter resembling a quadrilateral. The outer surface of the core may further define a third set of annular grooves disposed about a third axis, and extending radially inward from the common sphere, with the third axis being orthogonal to both the first axis and the second axis. The first, second, and third set of annular grooves may cooperate to define at least eight triangle sections. A plurality of ancillary grooves may be disposed within each triangle section to partially define at least three polygonal land portions having a perimeter selected from the group of a triangle, a pentagon, a hexagon, or an octagon. The total number of polygonal land portions across the entire outer surface may be between 100 and 300.

In one configuration, each of the first and second set of annular grooves respectively include at least three annular grooves. Additionally, each groove of the respective first and second set of annular grooves may be spaced apart from an adjacent groove of the respective first and second set of annular grooves by a distance of between 8 mm and 16 mm.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 17A is a schematic cross-sectional view of a pair of injection molding dies for forming a core of a golf ball.

FIG. 17B is a schematic cross-sectional view of a pair of injection molding dies having a thermoplastic core of a golf ball formed therein.

FIG. 18A is a schematic cross-sectional view of piece of rubber stock.

FIG. 18B is a schematic cross-sectional view of an intermediate layer cold-formed blank.

FIG. 18C is a schematic cross-sectional view of a pair of compression molding dies being used to form a pair of cold-formed blanks about a metallic spherical core.

FIG. 18D is a schematic cross-sectional view of a pair of compression molding dies being used to compression mold an intermediate layer of a golf ball about a polymeric core.

DETAILED DESCRIPTION

Golf Ball Design

Figure 1:
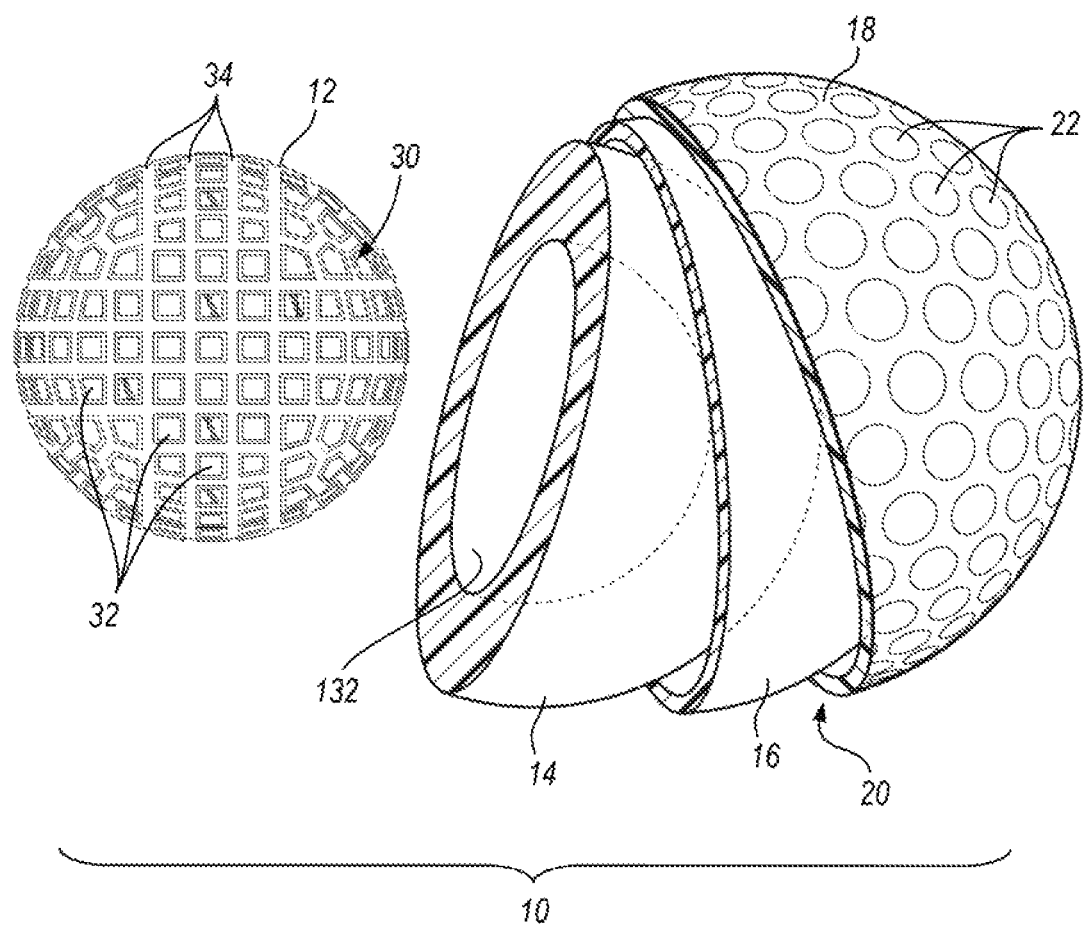
FIG. 1 is a partially exploded, schematic partial cross-sectional view of a multi-layer golf ball.

Referring to the drawings, wherein like reference numerals are used to identify like or identical components in the various views, FIG. 1 schematically illustrates a schematic, exploded, partial cross-sectional view of a golf ball 10. As shown, the golf ball 10 may have a multi-layer construction that includes a core 12 surrounded by one or more intermediate layers 14, 16, and a cover 18 (i.e., where the cover 18 surrounds the one or more intermediate layers 14, 16). While FIG. 1 generally illustrates a ball 10 with a four-piece construction, the presently described structure and techniques may be equally applicable to three-piece balls, as well as five or more piece balls. In general, the cover 18 may define an outermost portion 20 of the ball 10, and may include any desired number of dimples 22, including, for example, between 280 and 432 total dimples, and in some examples, between 300 and 392 total dimples, and typically between 298 to 360 total dimples. As known in the art, the inclusion of dimples generally decreases the aerodynamic drag of the ball, which may provide for greater flight distances when the ball is properly struck.

In a completely assembled ball 10, each layer (including the core 12, cover 18, and one or more intermediate layers 14, 16) may be substantially concentric with every other layer such that every layer shares a common geometric center. Additionally, the mass distribution of each layer may be uniform such that the center of mass for each layer, and the ball as a whole, is coincident with the geometric center.

Figure 2:
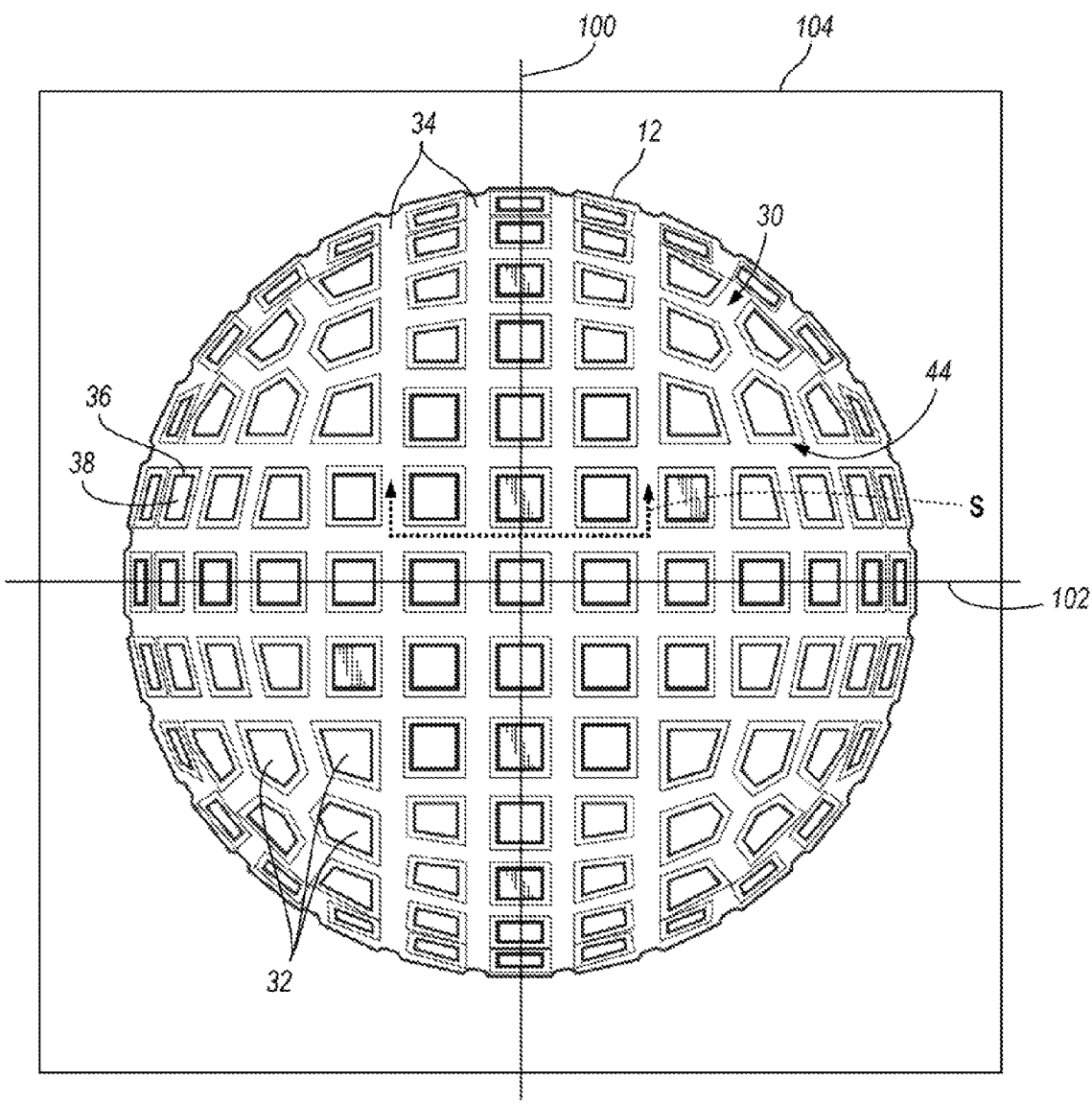
FIG. 2 is a side view of an embodiment of a core of a golf ball.

As generally shown in FIG. 1, and again in FIG. 2, the core 12 may have an outer surface 30 that has a varying radial dimension. For example, in one configuration as shown, the outer surface 30 may include a plurality of spaced polygonal land portions 32 that may be separated from each other by one or more grooves 34. Each groove 34 may be a portion of the outer surface 30 that extends radially inward from the land portions 32. As may be appreciated, each polygonal land portion may have a perimeter or outer profile 36 that resembles a polygon, such as a triangle, a quadrilateral, a pentagon, a hexagon, or an octagon. The perimeter may surround a central land 38 that may be substantially flat, or may have a convex or concave surface profile relative to the core 12.

Figure 3:
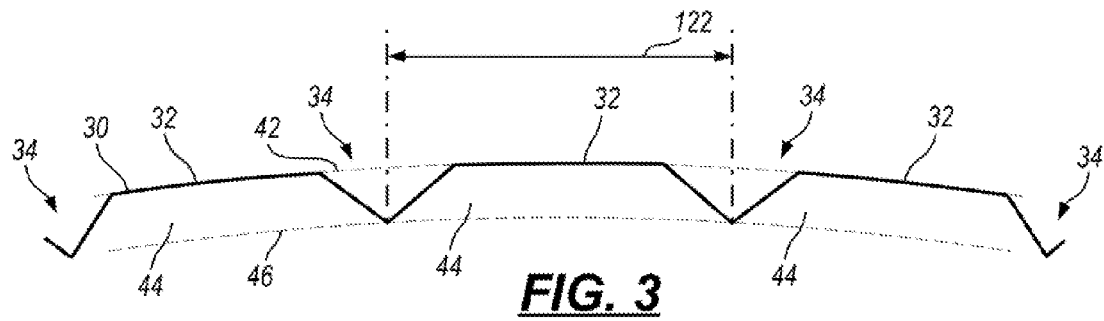
FIG. 3 is a partial cross-sectional view of a portion of a first embodiment of the outer surface of a core, such as taken along section-S of FIG. 2.
Figure 4:
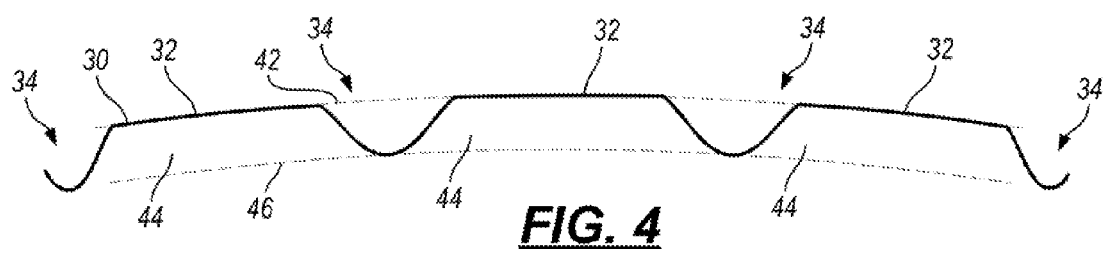
FIG. 4 is a schematic partial cross-sectional view of a portion of a second embodiment of the outer surface of a core, such as taken along section-S of FIG. 2.
Figure 5:
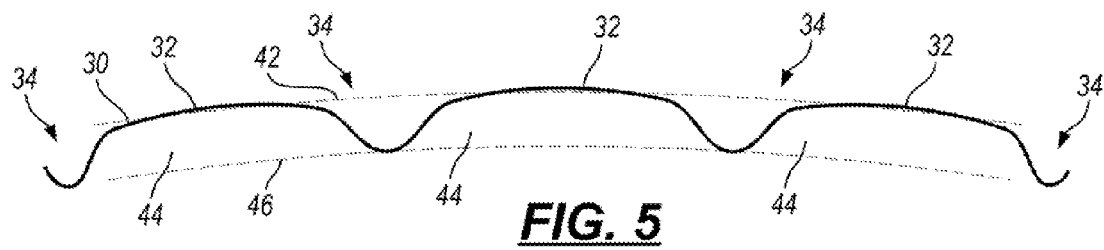
FIG. 5 is a schematic partial cross-sectional view of a portion of a third embodiment of the outer surface of a core, such as taken along section-S of FIG. 2.
Figure 6:
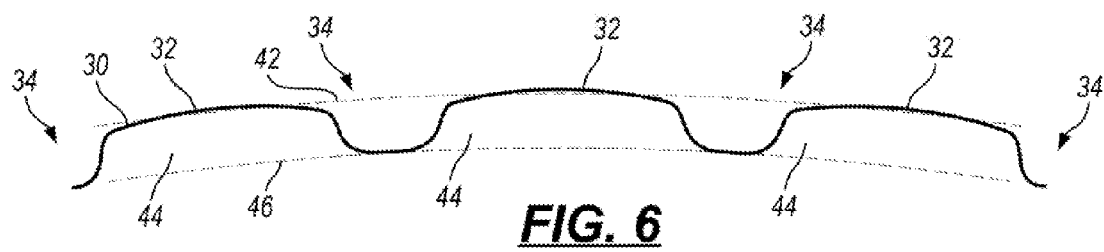
FIG. 6 is a schematic partial cross-sectional view of a portion of a fourth embodiment of the outer surface of a core, such as taken along section-S of FIG. 2.
Figure 7:
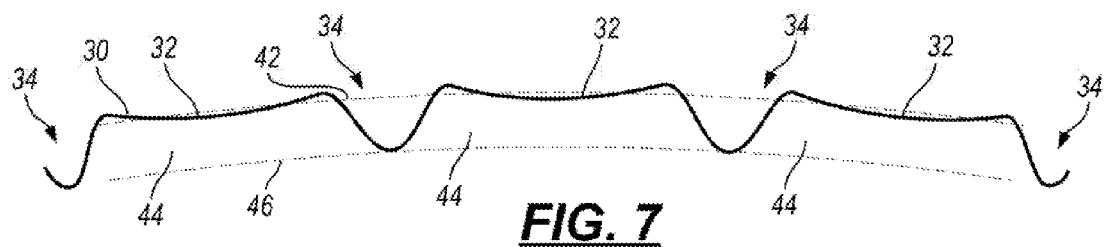
FIG. 7 is a schematic partial cross-sectional view of a portion of a fifth embodiment of the outer surface of a core, such as taken along section-S of FIG. 2.

FIGS. 3-7 generally illustrate five schematic cross-sectional views of a portion of the outer surface 30, such as may be taken along section S in FIG. 2. In each figure, each illustrated polygonal land portion 32 may be substantially aligned along a common outer sphere 42 (i.e., a spherical datum), which may generally define the most radially outward portion of the core 12 and of each protrusion 44. A land portion 32 that is "substantially aligned" with the outer sphere 42 may be one that is entirely aligned with the sphere 42, such as shown in FIGS. 3 and 4, as well as one that may be flat, convex (such as shown in FIGS. 5-6), or concave (such as shown in FIG. 7) with an average radial position that is approximately equal to the radius of the sphere 42. In addition to the examples provided, one or more smaller depressions or protrusions may be formed within each respective land portion 32 to further enhance the surface area.

Each polygonal protrusion 44 may generally extend from a common inner sphere 46 that may be concentric with the outer sphere 42. The common inner sphere 46 may be a solid sphere formed from a suitable core material, as will be described in greater detail below. Each polygonal protrusion 44 may have a polygonal perimeter portion (i.e., when viewed from a radially inward direction) at some point along its radial thickness. For example, a protrusion 44 may have a generally polygonal base (i.e., proximate the inner sphere 46) and/or it may be generally polygonal at the land portion 32.

The outer surface 30 may generally include a plurality of grooves 34 or groove portions, with each groove 34 extending radially inward from the polygonal land portions 32 toward the common inner sphere 46. The grooves 34 may generally define and separate the polygonal protrusions 44 (or vice versa). FIGS. 8-13 generally illustrate six schematic cross-sectional profiles of various groove types. Each groove may generally be characterized by a width 50 between the land portions 32, measured at the outer sphere 42, and a maximum depth 52, measured from the outer sphere 42 to the most radially inward point of the groove 34 along a radial direction.

In general, each groove 34 may have a maximum depth 52 that is between about 0.15 mm and about 2.0 mm. In other embodiments, each groove 34 may have a maximum depth 52 that is between about 0.15 mm and about 1.0 mm, between about 0.15 mm and about 0.8 mm, between about 0.15 mm and about 0.5 mm, or between about 0.15 mm and about 0.3 mm. In one configuration, each groove 34 may have a substantially similar cross-sectional profile, and may each extend from the outer sphere 42 by some common maximum depth 52. In yet another configuration, there may be two or more, three or more, or four or more different types/sizes of grooves across the core 12. Additionally, each groove 34 may be dimensioned such that the ratio of the width 50 to depth 52 (w/d) is from about 2 and about 8.

Figure 8:
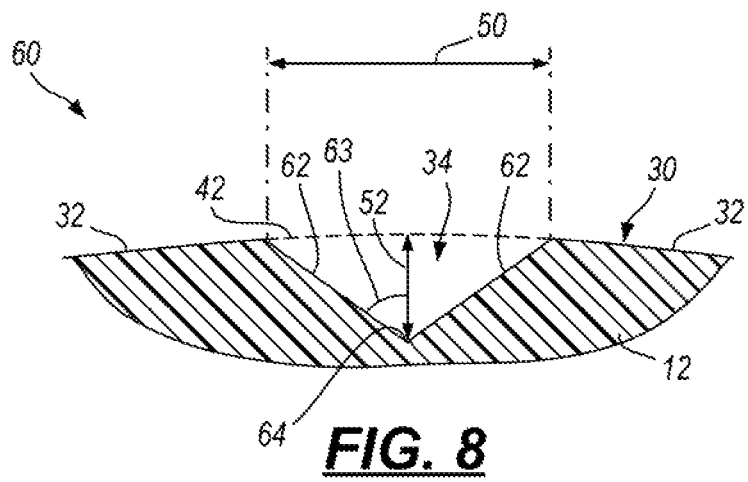
FIG. 8 is a schematic cross-sectional view of a first embodiment of a groove.
Figure 9:
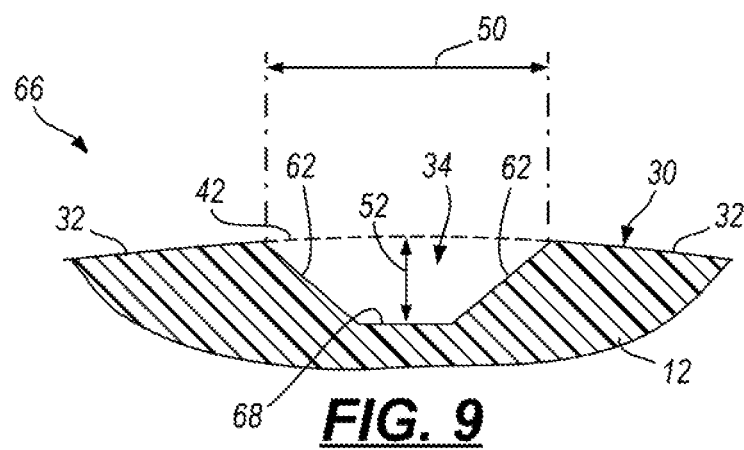
FIG. 9 is a schematic cross-sectional view of a second embodiment of a groove.
Figure 10:
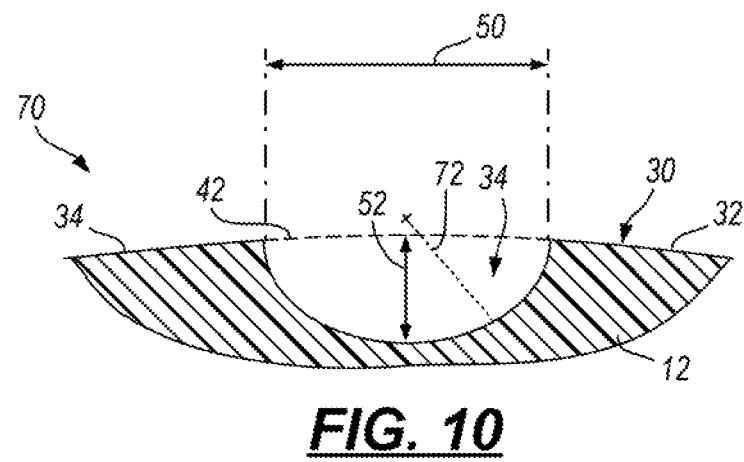
FIG. 10 is a schematic cross-sectional view of a third embodiment of a groove.
Figure 11:
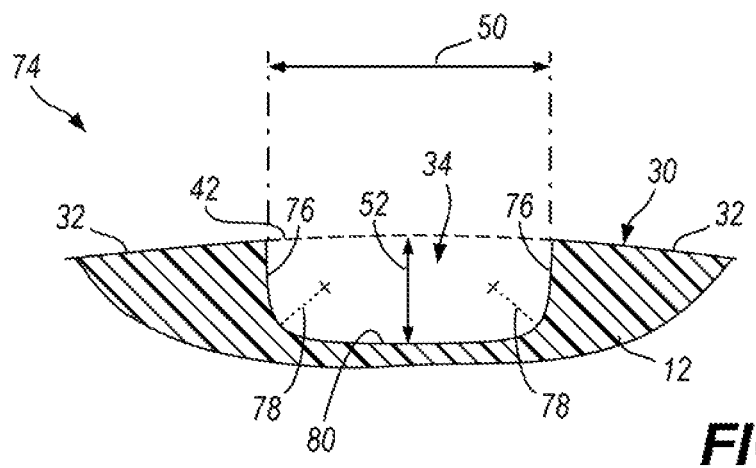
FIG. 11 is a schematic cross-sectional view of a fourth embodiment of a groove.
Figure 12:
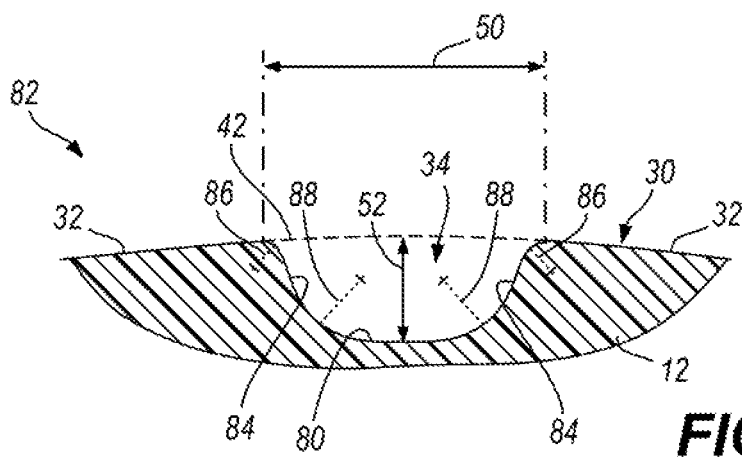
FIG. 12 is a schematic cross-sectional view of a fifth embodiment of a groove.

As generally illustrated in FIG. 8, in a first configuration 60, a groove 34 may include linearly sloping sidewalls 62 that meet at a central point 64. In one configuration, the sidewalls 62 may be disposed at an oblique angle relative to the radial axis and/or to the polygonal land portion 32. For example, the linearly sloping sidewalls 62 may be disposed at an angle 63 between about 40° and about 80° or between about 55° and about 65° away from a radial axis. In a second configuration 66 (FIG. 9), similar linearly sloping sidewalls 62 may meet at a substantially planar central portion 68 instead of a point 64.

In a third groove configuration 70 (FIG. 10), the entire groove 34 may have a continuous (potentially varying) curvature 72. In one configuration, the radius of curvature at a central point on the groove 34 may be in the range of 1.0 mm to about 8.0 mm. In a fourth configuration 74 (FIG. 11), each sidewall 76 may include a radius 78 that may transition from a sloping sidewall 76 to a central portion 80. The radius 78 may be, for example, between about 0.25 mm and about 2.0 mm or between about 0.4 mm and about 0.8 mm. In a fifth configuration 82 (FIG. 12), each sloping sidewall 84 may include two radiuses 86, 88 that may respectively transition from the polygonal land portion 32 to the sidewall 84, and from the sidewall 84 to a central portion 80. In one configuration, each radius 86, 88 may be, for example, between about 0.25 mm and about 2.0 mm or between about 0.4 mm and about 0.8 mm.

Figure 13:
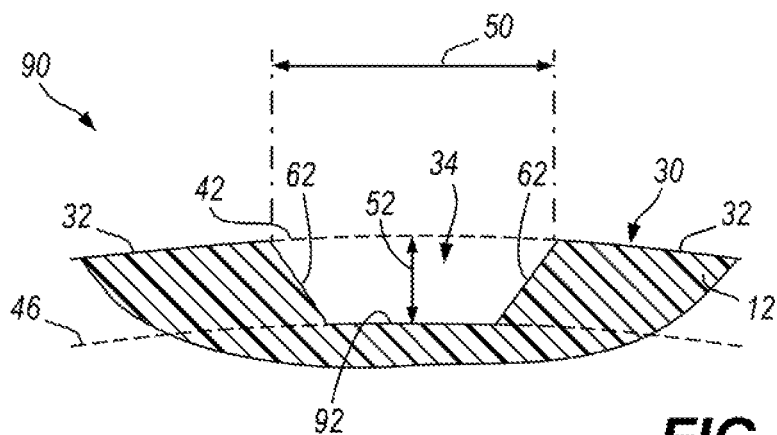
FIG. 13 is a schematic cross-sectional view of a sixth embodiment of a groove.

Finally, in a sixth groove configuration 90 (FIG. 13), linearly sloping sidewalls 62 may meet at a central portion 92 that has a curvature. As generally shown in FIG. 13, the central portion 92 may be substantially aligned on the inner sphere 46. It should be appreciated that these six groove configurations are provided for illustrative purposes. In addition to those explicitly provided in the figures, combinations of one or more of the configurations may also be used.

Referring again to FIG. 2, in one configuration, there may be between about 60 and about 90 polygonal land portions 32 disposed about the outer surface 30 of the core 12. In another configuration, there may be between about 100 and about 300 polygonal land portions 32 disposed about the outer surface 30 of the core 12. In still other configurations, there may be between about 100 and about 200 polygonal land portions 32, such as for example, 134 polygonal land portions 32, or between about 200 and about 300 polygonal land portions 32, such as for example, 246 polygonal land portions 32. The polygonal land portions 32 may form from about 25% to about 45% of the total surface area of the outer surface 30, with the remaining surface area being attributable to the grooves 34.

As generally shown in FIG. 2, the polygonal protrusions 44 and polygonal land portions 32 may be arranged across the surface 30 such that they establish at least two orthogonal planes of symmetry 100, 102. In a more specific embodiment, they may further establish a third plane of symmetry 104 that is orthogonal to each of the first two planes 100, 102, and where all three planes intersect at the geometric center of the core 12. In this manner, despite the profiled outer surface 30, the core 12 may have a "balanced" weight distribution.

Figure 14:
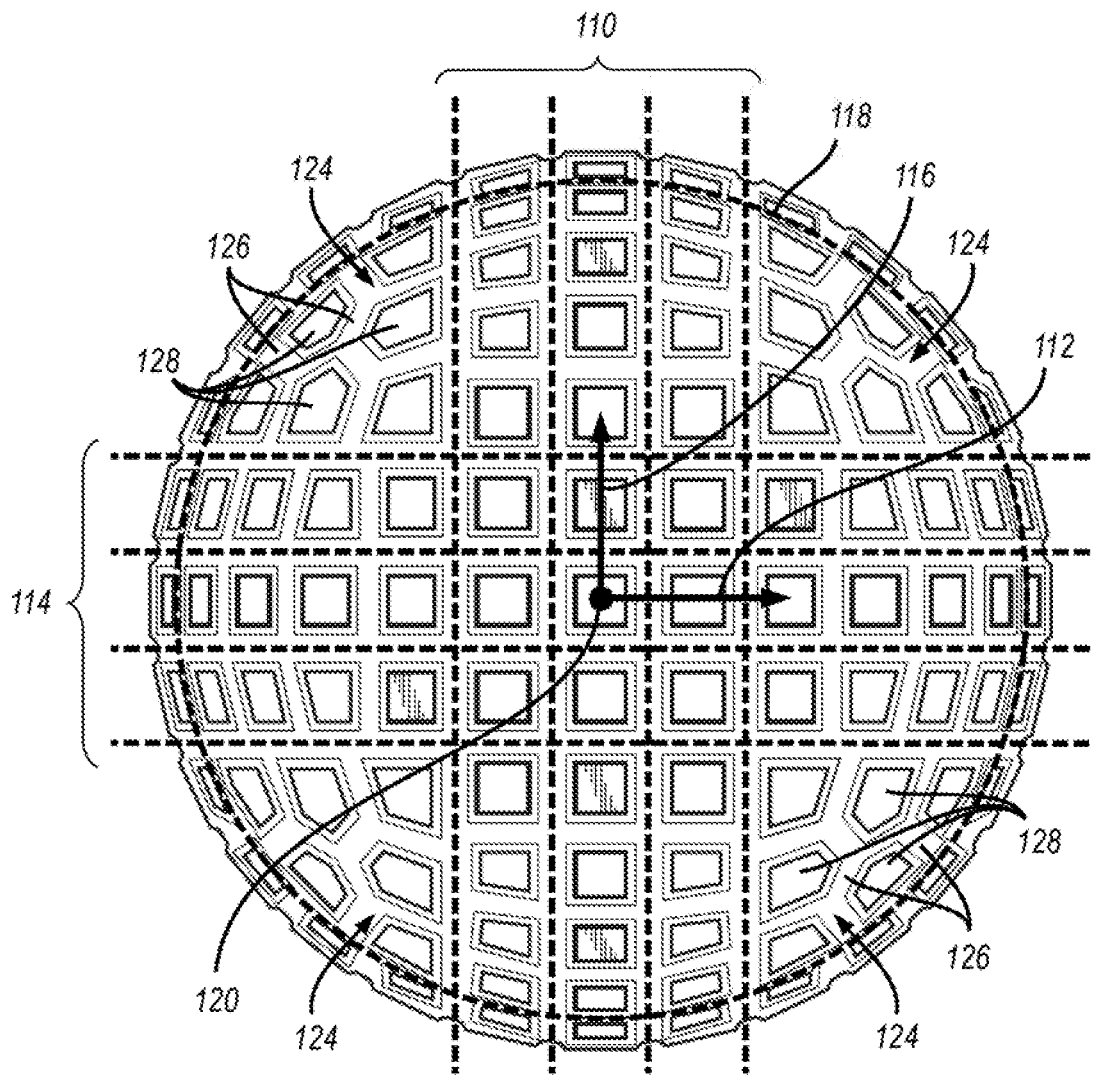
FIG. 14 is a side view of an embodiment of a core of a golf ball, annotated to illustrate a plurality of the annular grooves.

In some embodiments, the arrangement of the polygonal protrusions 44 and polygonal land portions 32 across the outer surface 30 may be most easily explained by the groove patterns that separate/define them. For example, as shown in FIG. 14, in one configuration, a first set of annular grooves 110 may be circumferentially disposed about a first axis 112, and a second set of annular grooves 114 may be circumferentially disposed about a second axis 116. The phantom lines provided in FIG. 14 are intended to merely aid in identifying the referenced groove locations. As shown, the first and second axes 112, 116 may be orthogonal to each other, and may intersect at the geometric center of the core 12. In addition, a third set of annular grooves 118 may be disposed about a third axis 120 that is orthogonal to each of the first and second axes 112, 116 (i.e., axis 120 is represented as a dot, and extends normal to the view). The first, second, and third sets of annular grooves 110, 114, 118 may cooperate to define a plurality of quadrilateral protrusions and/or land portions 120. Each quadrilateral land portion has a four sided perimeter that may be made up from either straight edge sections, or slightly arcuate edge sections (e.g. due to the curvature of the core 12). In one configuration, more than 80% of the polygonal land portions 32 may be quadrilateral land portions 120.

Each set of annular grooves 100, 104, 108 may, for example include at least three annular grooves disposed in a spaced arrangement along its respective axis 112, 116, 120. In another configuration, as shown in FIG. 14, each set of annular grooves 110, 114, 118 may instead include at least four annular grooves. As most clearly illustrated in the cross-sectional view provided in FIG. 3, any two adjacent grooves in a respective set may be spaced apart by a distance 122 of, for example, from about 8 mm to about 16 mm.

Referring again to FIG. 14, the respective first, second, and third sets of annular grooves 110, 114, 118 may cooperate to define eight substantially triangular shaped sections or regions 124, with one triangle section being located in each octant defined by the respective axes 112, 116, 120. A plurality of ancillary grooves 126 may be disposed within each triangle section 124, and may partially define at least three non-rectangular polygonal land portions 128 within each respective triangle section 124. In one configuration, each of the at least three non-rectangular polygonal land portions 128 may have a perimeter selected from the group of a triangle, a pentagon, a hexagon, or an octagon.

Figure 15:
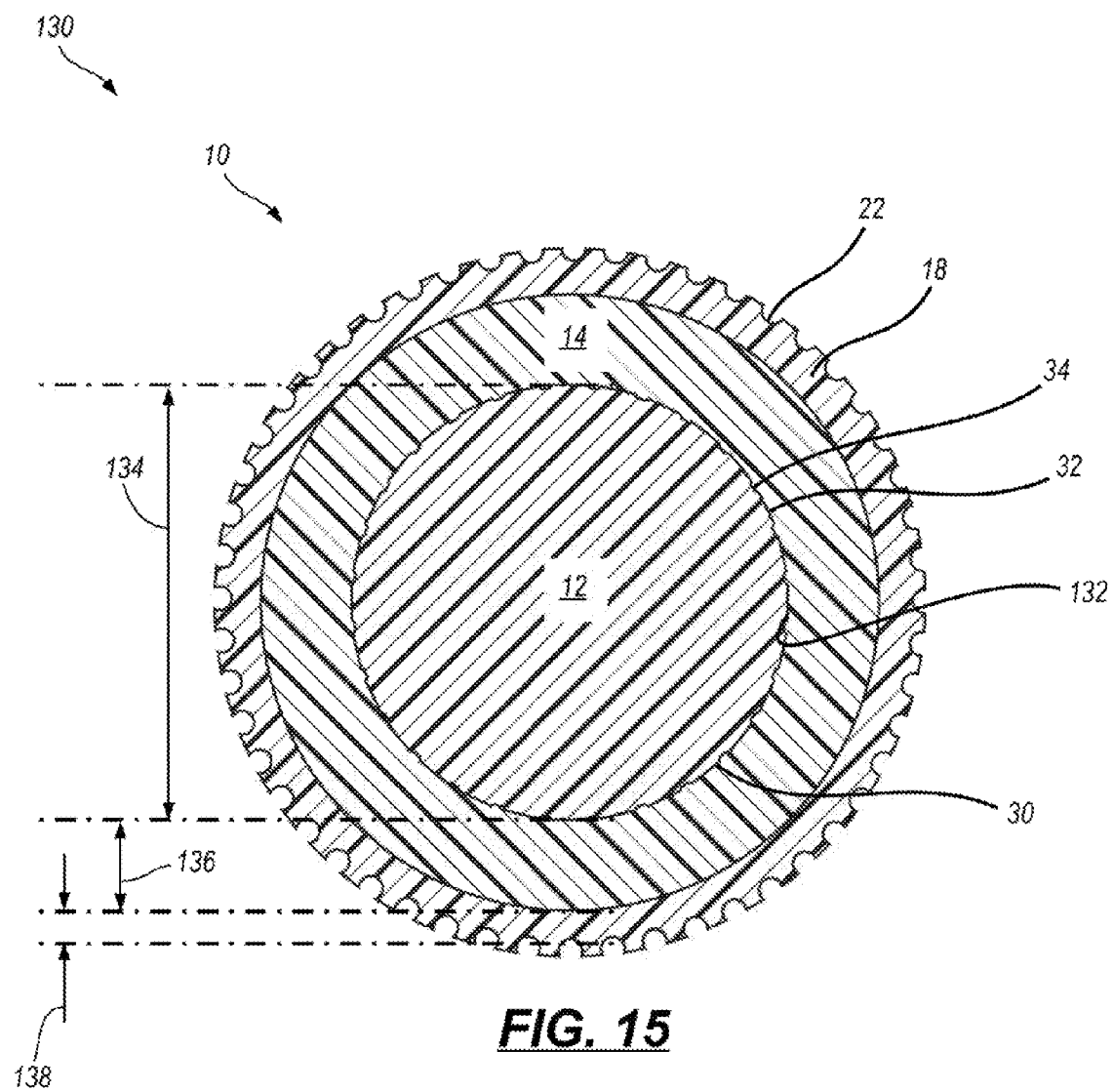
FIG. 15 is a schematic cross-sectional view of a multi-layer golf ball.

FIG. 15 generally illustrates a cross-sectional view 130 of a multi-layer golf ball 10. As shown, an intermediate layer 14 surrounds a core 12, and includes a radially inward-facing surface 132 that is bonded to the outer surface 30 of the core 12 across the entire outer surface 30. In this manner, the intermediate layer 14 completely surrounds the core 12, without leaving any voids between the intermediate layer 14 and the core 12. The bonding may occur either through direct material contact between the materials (i.e., physical bonding) or through one or more thin adhesive or adhesion-promoting layers (i.e., chemical bonding) that may be disposed between the core 12 and the intermediate layer 14. In one configuration, a thin, adhesion layer may be formed from a polymeric material disposed about the core 12, which may have a maximum radial thickness of less than about 1.0 mm.

As further illustrated in FIG. 15, the core may generally have a diameter 134 (measured via the radially outer sphere 42 and/or the polygonal land portions 32) of between about 24 mm and about 32 mm. Additionally, the intermediate layer 14 may have a minimum radial thickness 136 of between about 4.0 mm and 9.0 mm. In some configurations, a second intermediate layer 16 may be included in the multi-layer ball 10 between the first intermediate layer 14 and the cover layer 18. In such a construction, the second intermediate layer 16 and cover layer 18 may have a combined thickness 138 at the narrowest portion of up to about 2.5 mm.

Figure 16:
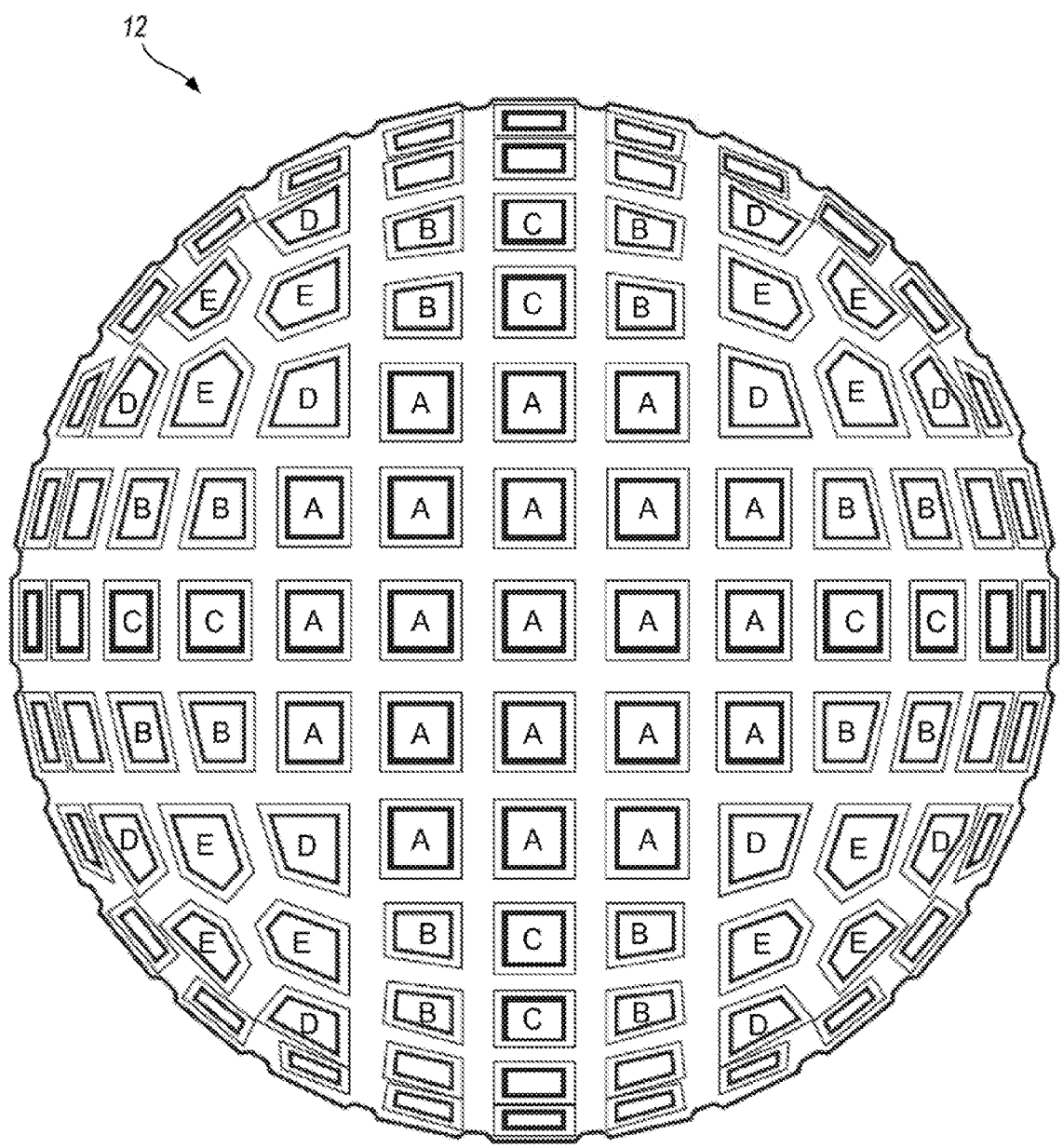
FIG. 16 is a side view of an embodiment of a core of a golf ball, annotated to illustrate a plurality of different types of protrusions.

FIG. 16 illustrates one embodiment of a core 12 according to the present description. In this embodiment, there are five types of land portions, marked A, B, C, D, and E. The first, second, and third sets of annular grooves 110, 114, 118 may cooperate to define land portions A, B, and C, which are all quadrilaterals, yet have slightly differing surface areas. Land portions D and E may lie within each triangle section 124, where land portion D is a quadrilateral (diamond) and land portion E is a pentagon. Contouring the core 12 in this manner (i.e., with a plurality of polygonal protrusions 44 separated by grooves 34), may result in an increase in the surface area of the core 12 by about 5% to about 25%. In this embodiment, the non-quadrilateral land portions (i.e., land portion E) comprises from about 5% to about 15% of the total number of land portions.

Golf Ball Manufacturing and Material Parameters

In general, the golf ball 10 may be formed through one or more injection molding or compression molding steps. For example, in one configuration, the fabrication of a multi-layer golf ball 10 may include: forming a core 12 through injection molding; compression molding one or more cold formed or partially-cured intermediate layers 14, 16 about the core 12; and forming a cover layer 18 about the intermediate layer 14 though injection molding or compression molding.

As schematically illustrated in FIGS. 17A & 17B, during the injection molding process used to form the core 12, two hemispherical dies 150, 152 may cooperate to form a mold cavity 154 that may be filled with a thermoplastic material 156 in a softened state. The hemispherical molding dies 150, 152 may meet at a parting line 158 that, in one configuration, may be aligned along a plane of symmetry 100, 102, or 104 of the core 12. In one configuration, a thermoplastic ionomer may be used to form the core 12, such as one that may have a Vicat softening temperature, measured according to ASTM D1525, of between about 50° C. and about 60° C., or alternatively between about 52° C. and about 55° C. Suitable thermoplastic ionomeric materials are commercially available, for example, from the E. I. du Pont de Nemours and Company under the tradename Surlyn®. More specific examples of suitable thermoplastic materials are described below.

Once the material 156 is cooled to ambient temperature, it may harden and be removed from the molding dies. The ease with which the solidified core 12 may be ejected from the dies may vary inversely with the degree to which the outer surface 30 is contoured. For example, as the depth of the grooves 34 increase, the mold, itself, may restrict the ejection of the core (i.e., referred to as undercut). While the inherent compliance and/or flexibility of the thermoplastic material, along with natural shrinkage of the core 12, may permit some amount of undercut, a groove depth of greater than about 2.0 mm may restrict the ability to use a solid hemispherical mold to fabricate the core and may considerably increase manufacturing cost and complexity. Incorporating sloped sidewalls 42 with the plurality of grooves 34 may serve to reduce the amount of undercut, and may allow for a greater maximum groove depth.

Once the core 12 is formed and removed from the mold, any molding flash may be removed using any combination of cutting, grinding, sanding, tumbling with an abrasive media, and/or cryogenic deflashing. Following the deflashing, an adhesive or bonding agent may be applied to the outer surface 30, such as through spraying, tumbling, and/or dipping. Additionally, one or more surface treatments may also be employed at this stage, such as mechanical surface roughening, plasma treatment, corona discharge treatment, or chemical treatment to increase subsequent adhesion. Nonlimiting, suitable examples of adhesives and bonding agents that may be used include polymeric adhesives such as ethylene vinyl acetate copolymers, two-component adhesives such as epoxy resins, polyurethane resins, acrylic resins, polyester resins, and cellulose resins and crosslinkers therefor, e.g., with polyamine or polycarboxylic acid crosslinkers for polyepoxides resins, polyisocyanate crosslinkers for polyalcohol-functional resins, and so on; or silane coupling agents or silane adhesives. The adhesive or bonding agent may be used with or without a surface treatment such as mechanical surface roughening, plasma treatment, corona discharge treatment, or chemical treatment.

Once any surface coatings/preparations are applied/performed (if any), the intermediate layer 14 may then be formed around the core 12, for example, through a compression molding process or a subsequent injection molding process. During compression molding, two cold formed and/or pre-cured hemispherical blanks may be press-fit around the core 12. Once positioned, a suitable die may apply heat and/or pressure to the exterior of the blanks to cure/crosslink the blanks while fusing them together. During the curing process, the application of heat may cause the hemispherical blanks to initially soften and/or melt prior to the start of any crosslinking. The applied pressure may then cause the molten material to conform to the outer surface 30 of the core 12. The curing process may be accelerated and/or initiated when as the material temperature approaches or exceeds about 200° C. In one configuration, the intermediate layer 14 may be formed from a rubber material, which may include a main rubber (e.g., a polybutadiene), an unsaturated carboxylic acid or metal salt thereof, and an organic peroxide. Other examples of suitable rubbers and specific formulations are provided below.

FIGS. 18A-18D further illustrate an embodiment of a process that may be used to compression mold an intermediate layer 14 about the core 12. As shown in FIG. 18A, the intermediate layer may begin as piece of rubber stock 160 that may include one or more crosslinking agents and/or fillers that may be homogeneously or heterogeneously mixed throughout the stock 160. The stock 160 may be cold-formed into a substantially hemispherical blank 162 (shown in FIG. 18B) through one or more cutting, stamping, or pressing processes.

As schematically shown in FIG. 18C, two compression molding dies 164, 166 may form a pair of opposing blanks 168, 170 about a spherical metal core 172. At this stage, the blanks 168, 170 may be either cold-formed or partially cured through the application of heat so that they may retain a true hemispherical shape (within applicable tolerances). Finally, as shown in FIG. 18D, the spherical metal core 172 may be replaced by the contoured thermoplastic core 12, and the blanks 168, 170 may be compression molded a second time by a second pair of opposing molding dies 172, 174 (which may or may not be the same dies 164, 166 used in the prior step). During this stage, the dies 172, 174 may apply a sufficient amount of heat and pressure to cause the blanks 168, 170 to flow within the mold cavity, and both internally crosslink and fuse to each other. Once set, the intermediate ball (i.e., the joined core 12 and intermediate layer 14) may be removed from the mold.

The cover layer 18 may generally surround the one or more intermediate layers 14, 16, and may define the outermost surface of the ball 10. The cover may generally be formed from a thermoplastic material, such as a thermoplastic polyurethane that may have a flexural modulus of up to about 1000 psi. In other embodiments, the cover may be formed from a ionomer, such as commercially available from the E. I. du Pont de Nemours and Company under the tradename Surlyn®. When a thermoplastic polyurethane is used, the cover may have a hardness measured on the Shore-D hardness scale of up to about 65, measured on the ball. In other embodiments, the thermoplastic polyurethane cover may have a hardness measured on the Shore-D hardness scale of up to about 60, measured on the ball. If other ionomers are used to form the cover layer, the cover may have a hardness measured on the Shore-D hardness scale of up to about 72.

If a second intermediate layer 16 is utilized in the construction of the multi-layer ball 10, the second intermediate layer 16 may have a hardness measured on the Shore-D scale of at least about 63, and also greater than the hardness of the cover layer.

In one configuration, the thermoplastic material used for the core 12 may have a flexural modulus of up to about 10,000 psi (flexural modulus being measured according to ASTM D790), such as the Surlyn® grades 8120, 8320, 9320, available from E. I. du Pont de Nemours and Company, or such as those that may have a flexural modulus of between about 6000 psi and about 7000 psi, or even between about 6300 psi and about 6700 psi. In addition to being specified by the flexural modulus (or alternatively), the ionomeric material used for the core 12 may have a hardness measured on the Shore D scale of up to about 40, measured on the ball. In alternative embodiments, the material may have a hardness measured on the Shore D scale of between about 30 and about 40, or between about 32 and about 36. Hardness on the Shore-D hardness scale is measured according to ASTM D2240, but in this specific application, it is measured on a land area of a curved surface of the ball or sub-layer of the ball (i.e., generally referred to as "on the ball"). It is understood in this technical field of art that the hardness measured in this way often varies from the hardness of a flat slab or button of material in a non-linear way that cannot be correlated, for example because of effects of underlying layers. Because of the curved surface, care must be taken to center the golf ball or golf ball subassembly under the durometer indentor before a surface hardness reading is obtained and to measure an even area, e.g. on the dimpled surface cover measurements are taken on a land (fret) area between dimples. In addition to Shore-D hardness, the core 12 may have a hardness measured on the JIS-C scale of between 34 and 70, which may be measured on the ball using a standard JIS-C hardness meter.

"Compression deformation" refers to the deformation amount under a compressive load of 130 kg minus the deformation amount under a compressive load of 10 kg. To determine a "10-130 kg compression deformation," the amount of deformation of the ball under a force of 10 kg is measured, then the force is increased to 130 kg and the amount of deformation under the new force of 130 kg is measured. The deformation amount at 10 kg is subtracted from the deformation amount at 130 kg to give the "10-130 kg compression deformation."

In the present multi-layer golf ball, the core 12 may have a 10-130 kg compression deformation (C1) of between about 3.5 mm and about 5.5 mm. When the core 12 and the intermediate layer 14 are combined to form an inner ball, the inner ball may have a 10-130 kg compression deformation (C2) of at least about 2.7 mm, though less than C1. In one configuration, C2 may be from about 2.7 mm to about 3.5 mm. When the ball is tested as a whole (i.e., core, intermediate layer(s), and cover), the ball may have a 10-130 kg compression deformation (C3) of at least about 2.3 mm or between about 2.5 mm and about 3.5 mm. In one configuration, the ratio of C2/C1 may be between about 0.6 and 0.8.

In one configuration, the above-described golf ball may be designed to have a coefficient of restitution at 40 m/s of up to about 0.8 or between about 0.77 and about 0.80. Coefficient of restitution or COR in the present invention may be measured generally according to the following procedure: a golf ball is fired by an air cannon at an initial velocity of 40 m/s, and a speed monitoring device is located over a distance of 0.6 to 0.9 meters from the cannon. After striking a steel plate positioned about 1.2 meters away from the air cannon, the test object rebounds through the speed-monitoring device. The return velocity divided by the initial velocity is the COR.

As described above, in some embodiments, the above-described contoured core 12, may result in an increase in the surface area of the core 12 by about 5% to about 25% above that of a generic sphere. It has generally been found that, an increase in core surface area 152 may result in an increase in ultimate adhesion strength 154 between the core 12 and the intermediate layer 14. Such an increase in adhesion may corresponding increase the load transfer efficiency between the respective layers.

In addition to increasing ultimate adhesion strength 154 between layers, ball strike data shows that a contoured core with a maximum groove depth of between about 0.2 mm and about 0.6 mm produces faster resultant launch speeds, at higher launch angles, with less spin, across a range of club types. These are all advantageous qualities when attempting to maximize the travel distance for a particular ball strike. Table 1, below, provides a summary of certain ball strike data for a design similar to FIG. 16, and having a maximum groove depth of about 0.5 mm.

TABLE 1

Average change and percent increase over a ball with a spherical core

|  | Driver | 6 Iron | 9 Iron |
| --- | --- | --- | --- |
| Launch Speed | 0.15 mph | 0.21 mph | 0.16 mph |
|  | 0.10% | 0.19% | 0.16% |
| Launch Angle | 0.06 deg | 0.02 deg | 0.13 deg |
|  | 0.56% | 0.10% | 0.54% |
| Spin | −17.3 rpm | −35.5 rpm | −75.6 rpm |
|  | −0.58% | −0.62% | −0.92% |

Ball strike testing is performed by an automated hitting machine that is capable of repeatable club motion across a plurality of ball strikes. The hitting machine has a rotating arm driven by a servo motor with a centrifugal wrist allowing for club head rotation to better mimic an actual golf swing. The hitting machine is controllable by a number of parameters, all of which are adjusted in order to achieve a desired golf ball launch condition. The swing motion of the testing machine is generally designed to mimic real life swing profiles and launch conditions (e.g., ranging from amateurs to professionals). The initial ball launch parameters may be monitored by optical and/or radar systems that may be specifically designed for tracking flight parameters of golf balls.

Golf Ball Material Composition

Each of the center and intermediate layer or layers may be made of one or more elastomeric materials and may also include one or more non-elastomeric materials. The elastomeric materials include thermoplastic elastomers and thermoset elastomers including rubbers and crosslinked block copolymer elastomers. Nonlimiting examples of suitable thermoplastic elastomers that can be used in making the golf ball center, each intermediate layer, and cover include metal cation ionomers of addition copolymers ("ionomer resins"), metallocene-catalyzed block copolymers of ethylene and α-olefins having 4 to about 8 carbon atoms, thermoplastic polyamide elastomers (polyether block polyamides), thermoplastic polyester elastomers, thermoplastic styrene block copolymer elastomers such as poly(styrene-butadiene-styrene), poly(styrene-ethylene-co-butylene-styrene), and poly (styrene-isoprene-styrene), thermoplastic polyurethane elastomers, thermoplastic polyurea elastomers, and dynamic vulcanizates of rubbers in these thermoplastic elastomers and in other thermoplastic matrix polymers. The center, each intermediate layer, and cover may also be made of thermoset materials, particularly crosslinked elastomers. The center and each intermediate layer in particular may also be made from a rubber.

Ionomer resins are metal cation ionomers of addition copolymers of ethylenically unsaturated acids. Preferred ionomers are copolymers of at least one alpha olefin, at least one $C_{3-8}$ α,β-ethylenically unsaturated carboxylic acid, and optionally other comonomers. The copolymers may contain as a comonomer at least one softening monomer such as an ethylenically unsaturated ester, for example vinyl acetate or an alkyl acrylate or methacrylate such as a $C_1$ to $C_8$ alkyl acrylate or methacrylate ester.

The weight percentage of acid monomer units in the ionomer copolymer may be in a range having a lower limit of about 1 or about 4 or about 6 or about 8 or about 10 or about 12 or about 15 or about 20 weight percent and an upper limit of about 20 (when the lower limit is not 20) or about 25 or about 30 or about 35 or about 40 weight percent based on the total weight of the acid copolymer. The α,β-ethylenically unsaturated acid is preferably selected from acrylic acid, methacrylic acid, ethacrylic acid, maleic acid, crotonic acid, fumaric acid, itaconic acid, and combinations of these. In various embodiments, acrylic acid and methacrylic acid may be particularly preferred.

The acid monomer is preferably copolymerized with an alpha-olefin selected from ethylene and propylene. The weight percentage of alpha-olefin units in the ionomer copolymer may be at least about 15 or about 20 or about 25 or about 30 or about 40 or about 50 or about 60 weight based on the total weight of the acid copolymer.

In certain preferred embodiments, particularly for the cover, the ionomer includes no other comonomer besides the alpha-olefin and the ethylenically unsaturated carboxylic acid. In other embodiments, a softening comonomer is copolymerized. Nonlimiting examples of suitable softening comonomers are alkyl esters of $C_{3-8}$ α,β-ethylenically unsaturated carboxylic acids, particularly those in which the alkyl group has 1 to 8 carbon atoms, for instance methyl methacrylate, ethyl acrylate, ethyl methacrylate, propyl acrylate, propyl methacrylate, butyl acrylate, butyl methacrylate, isobutyl acrylate, tert-butyl methacrylate, hexyl acrylate, 2-ethylhexyl methacrylate, and combinations of these. When the ionomer includes a softening comonomer, the softening comonomer monomer units may be present in a weight percentage of the copolymer in a range with a lower limit of a finite amount more than zero, or about 1 or about 3 or about 5 or about 11 or about 15 or about 20 weight percent of the copolymer and an upper limit of about 23 or about 25 or about 30 or about 35 or about 50 weight percent of the copolymer.

Nonlimiting specific examples of acid-containing ethylene copolymers include copolymers of ethylene/acrylic acid/n-butyl acrylate, ethylene/methacrylic acid/n-butyl acrylate, ethylene/methacrylic acid/isobutyl acrylate, ethylene/acrylic acid/isobutyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include copolymers of ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate. In various embodiments the most preferred acid-containing ethylene copolymers include ethylene/(meth)acrylic acid/n-butyl acrylate, ethylene/(meth)acrylic acid/ethyl acrylate, and ethylene/(meth)acrylic acid/methyl acrylate copolymers.

The acid moiety in the ethylene-acid copolymer may be neutralized by any metal cation. Suitable cations include lithium, sodium, potassium, magnesium, calcium, barium, lead, tin, zinc, aluminum, bismuth, chromium, cobalt, copper, stontium, titanium, tungsten, or a combination of these cations; in various embodiments alkali, alkaline earth, or zinc metal cations are preferred. In various embodiments, the acid groups of the ionomer may be neutralized from about 10% or from about 20% or from about 30% or from about 40% to about 60% or to about 70% or to about 75% or to about 80% or to about 90% or to 100%.

The ionomer resin may be a high acid ionomer resin. In general, ionomers prepared by neutralizing acid copolymers including at least about 16 weight % of copolymerized acid residues based on the total weight of the unneutralized ethylene acid copolymer are considered "high acid" ionomers. In these high modulus ionomers, the acid monomer, particularly acrylic or methacrylic acid, is present in about 16 to about 35 weight %. In various embodiments, the copolymerized carboxylic acid may be from about 16 weight %, or about 17 weight % or about 18.5 weight % or about 20 weight % up to about 21.5 weight % or up to about 25 weight % or up to about 30 weight % or up to about 35 weight % of the unneutralized copolymer. A high acid ionomer resin may be combined with a "low acid" ionomer resin in which the copolymerized carboxylic acid is less than 16 weight % of the unneutralized copolymer.

In various preferred embodiments, the ionomer resin is formed by adding a sufficiently high molecular weight, monomeric, mono-functional organic acid or salt of organic acid to the acid copolymer or ionomer so that the acid copolymer or ionomer can be neutralized, without losing processability, to a level above the level that would cause the ionomer alone to become non-melt-processable. The monomeric, mono-functional organic acid its salt may be added to the ethylene-unsaturated acid copolymers before they are neutralized or after they are optionally partially neutralized to a level between about 1 and about 100%, provided that the level of neutralization is such that the resulting ionomer remains melt-processable. In generally, when the monomeric, mono-functional organic acid is included the acid groups of the copolymer may be neutralized from at least about 40 to about 100%, preferably at least about 80% to about 100%, more preferably at least about 90% to about 100%, still more preferably at least about 95% to about 100%, and most preferably about 100% without losing processability. Such high neutralization, particularly to levels of at least about 80% or at least about 90% or at least about 95% or most preferably 100%, without loss of processability can be done by (a) melt-blending the ethylene α,β-ethylenically unsaturated carboxylic acid copolymer or a melt-processable salt of the copolymer with the organic acid or the salt of the organic acid, and (b) adding a sufficient amount of a cation source up to 110% of the amount needed to neutralize the total acid in the copolymer or ionomer and organic acid or salt to the desired level to increase the level of neutralization of all the acid moieties in the mixture preferably at least about 80%, at least about 90%, at least about 95%, or preferably to about 100%. To obtain 100% neutralization, it is preferred to add a slight excess of up to 110% of cation source over the amount stoichiometrically required to obtain the 100% neutralization.

The preferred monomeric, monofunctional organic acids are aliphatic or aromatic saturated or unsaturated acids that may have from 6 or from about 8 or from about 12 or from about 18 carbon atoms up to about 36 carbon atoms or up to 35 carbon atoms. Nonlimiting suitable examples of the monomeric, monofunctional organic acid includes caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives of these, and their salts, particularly the barium, lithium, sodium, zinc, bismuth, chromium, cobalt, copper, potassium, strontium, titanium, tungsten, magnesium or calcium salts. These may be used in any combination.

Many grades of ionomer resins are commercially available, for example from E.I. du Pont de Nemours and Company, Inc. under the trademark Surlyn® or the designation "HPF," from ExxonMobil Chemical under the trademarks Iotek™ and Escor™, or from Honeywell International Inc. under the trademark AClyn®. The various grades may be used in combination. In various preferred embodiments, the inomer resin may be a highly neutralized ionomer resin of the acrylic or methacrylic acid type, such as DuPont™ HPF 2000 or AD-1035 made by E.I. du Pont de Nemours and Company, Inc.

Thermoplastic polyolefin elastomers may also be used in making the golf ball. These are metallocene-catalyzed block copolymers of ethylene and α-olefins having 4 to about 8 carbon atoms that are prepared by single-site metallocene catalysis, for example in a high pressure process in the presence of a catalyst system comprising a cyclopentadienyl-transition metal compound and an alumoxane. Nonlimiting examples of the α-olefin softening comonomer include hexane-1 or octene-1; octene-1 is a preferred comonomer to use. These materials are commercially available, for example, from ExxonMobil under the tradename Exact™ and from the Dow Chemical Company under the tradename Engage™.

In various preferred embodiments, the golf ball includes a polyolefin elastomer, especially one of the thermoplastic polyolefin elastomers just described. The core center may include from about 5 percent by weight to about 50 percent by weight, preferably from about 10 percent by weight to about 30 percent by weight polyolefin elastomer based on the combined weights of polyolefin elastomer and ionomer resin.

In one embodiment, the core center or an intermediate layer is made of a combination of a metal ionomer of a copolymer of ethylene and at least one of acrylic acid and methacrylic acid, a metallocene-catalyzed copolymer of ethylene and an α-olefin having 4 to about 8 carbon atoms, and a metal salt of an unsaturated fatty acid. that may be prepared as described in Statz et al., U.S. Pat. No. 7,375,151 or as described in Kennedy, "Process for Making Thermoplastic Golf Ball Material and Golf Ball with Thermoplastic Material, U.S. patent application Ser. No. 13/825,112, filed 15 Mar. 2013, the entire contents of both being incorporated herein by reference.

Suitable thermoplastic styrene block copolymer elastomers that may be used in the center, intermediate layer, or cover of the golf ball include poly(styrene-butadiene-styrene), poly(styrene-ethylene-co-butylene-styrene), poly(styrene-isoprene-styrene), and poly(styrene-ethylene-co-propylene) copolymers. These styrenic block copolymers may be prepared by living anionic polymerization with sequential addition of styrene and the diene forming the soft block, for example using butyl lithium as initiator. Thermoplastic styrene block copolymer elastomers are commercially available, for example, under the trademark Kraton™ sold by Kraton Polymers U.S. LLC, Houston, Tex. Other such elastomers may be made as block copolymers by using other polymerizable, hard, non-rubber monomers in place of the styrene, including meth(acrylate) esters such as methyl methacrylate and cyclohexyl methacrylate, and other vinyl arylenes, such as alkyl styrenes.

Thermoplastic polyurethane elastomers such as thermoplastic polyester-polyurethanes, polyether-polyurethanes, and polycarbonate-polyurethanes may be used as a core or cover thermoplastic material. The thermoplastic polyurethane elastomers include polyurethanes polymerized using as polymeric diol reactants polyethers and polyesters including polycaprolactone polyesters. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is being used, are compounds having two or more functional groups reactive with isocyanate groups, such as the diols, amino alcohols, and diamines. Preferably the polymeric diol-based polyurethane is substantially linear (i.e., substantially all of the reactants are difunctional).

Diisocyanates used in making the polyurethane elastomers may be aromatic or aliphatic. Useful diisocyanate compounds used to prepare thermoplastic polyurethanes include, without limitation, isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, meta-xylylenediioscyanate and para-xylylenediisocyanate, 4-chloro-1,3-phenylene diisocyanate, 1,5-tetrahydro-naphthalene diisocyanate, 4,4'-dibenzyl diisocyanate, and xylylene diisocyanate (XDI), and combinations of these. Nonlimiting examples of higher-functionality polyisocyanates that may be used in limited amounts to produce branched thermoplastic polyurethanes (optionally along with monofunctional alcohols or monofunctional isocyanates) include 1,2,4-benzene triisocyanate, 1,3,6-hexamethylene triisocyanate, 1,6,11-undecane triisocyanate, bicycloheptane triisocyanate, triphenylmethane-4,4',4"-triisocyanate, isocyanurates of diisocyanates, biurets of diisocyanates, allophanates of diisocyanates, and the like.

Nonlimiting examples of suitable diols that may be used as extenders include ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; cyclohexanedimethanol, 1,6-hexanediol, 2-ethyl-1,6-hexanediol, 1,4-butanediol, 2,3-butanediol, 1,5-pentanediol, 1,3-propanediol, butylene glycol, neopentyl glycol, dihydroxyalkylated aromatic compounds such as the bis (2-hydroxyethyl)

ethers of hydroquinone and resorcinol; p-xylene-α,α'-diol; the bis (2-hydroxyethyl) ether of p-xylene-α,α'-diol; m-xylene-α,α'-diol, and combinations of these. Other active hydrogen-containing chain extenders that contain at least two active hydrogen groups may be used, for example, dithiols, diamines, or compounds having a mixture of hydroxyl, thiol, and amine groups, such as alkanolamines, aminoalkyl mercaptans, and hydroxyalkyl mercaptans, among others. Suitable diamine extenders include, without limitation, ethylene diamine, diethylene triamine, triethylene tetraamine, and combinations of these. Other typical chain extenders are amino alcohols such as ethanolamine, propanolamine, butanolamine, and combinations of these. The molecular weights of the chain extenders preferably range from about 60 to about 400. Alcohols and amines are preferred.

In addition to difunctional extenders, a small amount of a trifunctional extender such as trimethylolpropane, 1,2,6-hexanetriol and glycerol, or monofunctional active hydrogen compounds such as butanol or dimethyl amine, may also be present. The amount of trifunctional extender or monofunctional compound employed may be, for example, 5.0 equivalent percent or less based on the total weight of the reaction product and active hydrogen containing groups used.

The polyester diols used in forming a thermoplastic polyurethane elastomer are in general prepared by the condensation polymerization of one or more polyacid compounds and one or more polyol compounds. Preferably, the polyacid compounds and polyol compounds are di-functional, i.e., diacid compounds and diols are used to prepare substantially linear polyester diols, although minor amounts of mono-functional, tri-functional, and higher functionality materials can be included to provide a slightly branched, but uncrosslinked polyester polyol component. Suitable dicarboxylic acids include, without limitation, glutaric acid, succinic acid, malonic acid, oxalic acid, phthalic acid, hexahydrophthalic acid, adipic acid, maleic acid, suberic acid, azelaic acid, dodecanedioic acid, their anhydrides and polymerizable esters (e.g., methyl esters) and acid halides (e.g., acid chlorides), and mixtures of these. Suitable polyols include those already mentioned, especially the diols. Typical catalysts for the esterification polymerization are protonic acids, Lewis acids, titanium alkoxides, and dialkyltin oxides.

A polymeric polyether or polycaprolactone diol reactant for preparing thermoplastic polyurethane elastomers may be obtained by reacting a diol initiator, e.g., 1,3-propanediol or ethylene or propylene glycol, with a lactone or alkylene oxide chain-extension reagent. Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, ε-valerolactone, γ-decanolactone, δ-decanolactone, γ-nonanoic lactone, γ-octanoic lactone, and combinations of these. In one preferred embodiment, the lactone is ε-caprolactone. Useful catalysts include those mentioned above for polyester synthesis. Alternatively, the reaction can be initiated by forming a sodium salt of the hydroxyl group on the molecules that will react with the lactone ring. In other embodiments, a diol initiator may be reacted with an oxirane-containing compound to produce a polyether diol to be used in the polyurethane elastomer polymerization. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The oxirane-containing compound is preferably selected from ethylene oxide, propylene oxide, butylene oxide, tetrahydrofuran, and combinations of these. The alkylene oxide polymerization is typically base-catalyzed. The polymerization may be carried out, for example, by charging the hydroxyl-functional initiator compound and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition or polymerized in blocks by sequential addition. Homopolymers or copolymers of ethylene oxide or propylene oxide are preferred. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above. Polytetrahydrofuran is also known as polytetramethylene ether glycol (PTMEG).

Aliphatic polycarbonate diols that may be used in making a thermoplastic polyurethane elastomer may be prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

In various embodiments, the polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights may be determined by ASTM D4274.

The reaction of the polyisocyanate, polymeric diol, and diol or other chain extension agent is typically carried out at an elevated temperature in the presence of a catalyst. Typical catalysts for this reaction include organotin catalysts such as stannous octoate, dibutyl tin dilaurate, dibutyl tin diacetate, dibutyl tin oxide, tertiary amines, zinc salts, and manganese salts. Generally, for elastomeric polyurethanes, the ratio of polymeric diol, such as polyester diol, to extender can be varied within a relatively wide range depending largely on the desired flexural modulus of the final polyurethane elastomer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 1:1 to 1:1.05, and more preferably, 1:1 to 1:1.02. The polymeric diol segments typically are from about 35% to about 65% by weight of the polyurethane polymer, and preferably from about 35% to about 50% by weight of the polyurethane polymer.

Suitable thermoplastic polyurea elastomers may be prepared by reaction of one or more polymeric diamines or polyols with one or more of the polyisocyanates already mentioned and one or more diamine extenders. Nonlimiting examples of suitable diamine extenders include ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), N-(3-aminopropyl)-N-methyl-1,3-propanediamine), 1,4-bis(3-aminopropoxy)butane, diethyleneglycol-di(aminopropyl)ether), 1-methyl-2,6-diamino-cyclohexane, 1,4-diamino-cyclohexane, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N,N'-dialkylamino-dicyclohexylmethane, and 3,3'-diethyl-5,5'-dimethyl-4,4'-diamino-dicyclohexylmethane. Polymeric diamines include polyoxyethylene diamines, polyoxypropylene diamines, poly(oxyethylene-oxypropylene) diamines, and poly(tetramethylene ether) diamines. The amine- and hydroxyl-functional extenders already mentioned may be used as well. Generally, as before, trifunctional reactants are limited and may be used in conjunction with monofunctional reactants to prevent crosslinking.

Suitable thermoplastic polyamide elastomers may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylylenediamine, or any of the other diamines already mentioned; (2) a ring-opening polymerization of a cyclic lactam, such as ε-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Polymerization may be carried out, for example, at temperatures of from about 180° C. to about 300° C. Specific examples of suitable polyamide block copolymers include NYLON 6, NYLON 66, NYLON 610, NYLON 11, NYLON 12, copolymerized NYLON MXD6, and NYLON 46 block copolymer elastomers.

Thermoplastic polyester elastomers have blocks of monomer units with low chain length that form the crystalline regions and blocks of softening segments with monomer units having relatively higher chain lengths. Thermoplastic polyester elastomers are commercially available under the trademark Hytrel® from DuPont and under the trademark Pebax® from Arkema.

Another suitable example of thermoplastic elastomers are those having dispersed domains of cured rubbers incorporated in a thermoplastic matrix via dynamic vulcanization of rubbers. The thermoplastic matrix may be any of these thermoplastic elastomers or other thermoplastic polymers. One such composition is described in Voorheis et al, U.S. Pat. No. 7,148,279, which is incorporated herein by reference. In various embodiments, the core center may include a thermoplastic dynamic vulcanizate of a rubber in a non-elastomeric matrix resin such as polypropylene. Thermoplastic vulcanizates commercially available from ExxonMobil under the tradename Santoprene™ are believed to be vulcanized domains of EPDM in polypropylene.

Plasticizers or softening polymers may be incorporated. One example of such a plasticizer is the high molecular weight, monomeric organic acid or its salt that may be incorporated, for example, with an ionomer polymer as already described, including metal stearates such as zinc stearate, calcium stearate, barium stearate, lithium stearate and magnesium stearate. For most thermoplastic elastomers, the percentage of hard-to-soft segments is adjusted if lower hardness is desired rather than by adding a plasticizer.

Thermoset elastomers may also be used. In particular, cured rubbers may be used in the core and crosslinked thermoplastic elastomers may be used for the cover.

Suitable nonlimiting examples of base rubbers include butadiene, such as high cis-1,4 polybutadiene, natural rubber, polyisoprene rubber, styrene polybutadiene rubber, and ethylene-propylene-diene rubber (EPDM).

In various embodiments, the center or an intermediate layer many include a cured product of a rubber composition comprising a polybutadiene, an unsaturated carboxylic acid or metal salt of an unsaturated carboxylic acid, and an organic peroxide. In certain embodiments, the polybutadiene may have a Mooney viscosity ($ML_{1+4}(100°$ C.)) of at least about 40, preferably from about 40 to about 85, and more preferably from about 50 to about 85. "Mooney viscosity ($ML_{1+4}(100°$ C.))" is measured according to JIS K6300 using a Mooney viscometer, which is a type of rotary plastomer. In the term $ML_{1+4}(100°$ C.), "M" indicates Mooney viscosity, "L" stands for large rotor (L-type), and "1+4" indicates a pre-heating time of 1 minute and a rotor rotation time of 4 minutes. The "(100° C.)" indicates that the measurement is carried out at a temperature of 100° C.

In certain embodiments, the polybutadiene may have at least about 70%, preferably at least about 80%, more preferably at least about 90%, and still more preferably at least about 95%, and most preferably at least about 98% of the monomer units joined via cis-1,4 bonds based on the total number of butadiene monomer units. Higher cis-1,4-bond content in the polybutadiene generally increases resilience. Moreover, it may be preferred that the polybutadiene have a 1,2-vinyl bond content of preferably not more than 2%, more preferably not more than 1.7%, and even more preferably not more than 1.5%. Such high cis-1,4 polybutadienes are commercially available or can be polymerized using a rare-earth catalyst or a Group VIII metal compound catalyst, preferably a rare-earth catalyst. Nonlimiting examples of rare-earth catalysts that may be used include those made by a combination of a lanthanide series rare-earth compound with an organoaluminum compound, an alumoxane, a halogen-bearing compound, and an optional Lewis base. Examples of suitable lanthanide series rare-earth compounds include halides, carboxylates, alcoholates, thioalcoholates and amides of atomic number 57 to 71 metals. A neodymium catalyst is particularly advantageous because it results in a polybutadiene rubber having a high cis-1,4 bond content and a low 1,2-vinyl bond content. When other rubbers are included, the high cis-1,4 polybutadiene should be at least about 50% by weight, preferably at least about 80% by weight based on the total weight of base rubber.

The rubber composition may include an unsaturated carboxylic acid or metal salt of an unsaturated carboxylic acid which acts as a crosslinker or co-crosslinking agent. Such unsaturated carboxylic acids or salts may, in general, be α,β-ethylenically unsaturated acids having 3 to 8 carbon atoms such as acrylic acid, methacrylic acid, crotonic acid, maleic acid, and fumaric acid that may be used as their magnesium and zinc salts. Specific examples of preferable co-crosslinking agents include zinc diacrylate, magnesium diacrylate, zinc dimethacrylate and magnesium dimethacrylate. The amount of the unsaturated carboxylic acid or its salt is typically at least about 10 parts by weight, preferably at least about 15 parts by weight and up to about 50 parts by weight, preferably up to about 45 parts by weight per 100 parts by weight of the base rubber.

The rubber composition includes a free radical initiator or sulfur compound. Suitable initiators include organic peroxide compounds such as dicumyl peroxide, 1,1-di(t-butylperoxy) 3,3,5-trimethyl cyclohexane, α,α-bis(t-butylperoxy) diisopropylbenzene, 2,5-dimethyl-2,5 di(t-butylperoxy) hexane, di-t-butyl peroxide. The amount of the organic peroxide is typically at least about 0.1 part by weight, preferably at least about 0.3 part by weight, more preferably equal at least about 0.5 part by weight up to about 3.0 parts by weight, preferably up to about 2.5 parts by weight, based on 100 parts by weight of the base rubber. Nonlimiting examples of suitable sulfur compounds include thiophenols, thionaphthols, halogenated thiophenols, and metal salts of these, for example pentachlorothiophenol, pentafluorothiophenol, pentabromothiophenol, p-chlorothiophenol, and zinc salts thereof; diphenylpolysulfides, dibenzylpolysulfides, dibenzoylpolysulfides, dibenzothiazoylpolysulfides and dithiobenzoylpolysulfides having 2 to 4 sulfur atoms; alkylphenyldisulfides; and furan ring-containing sulfur compounds and thiophene ring-containing sulfur compounds, particularly diphenyldisulfide or the zinc salt of pentachlorothiophenol. The amount of the sulfur compound is typically at least about 0.05 part by weight, preferably at least about 0.2 part by weight, more preferably at least about 0.4 part by weight or at least about 0.7 part by weight up to about 5.0 parts by weight, preferably up to about 4 parts by weight, more preferably up to about 3 parts by weight or up to about 1.5 parts by weight, based on 100 parts by weight of the base rubber.

The cover may also be include a crosslinked thermoplastic elastomer, such as a crosslinked polyurethane, polyurea, or polyamide elastomer. Crosslinked polyurethane and polyurea covers may be formed by crosslinking a polyester or polymeric polyamine, for examples one of those described above in making thermoplastic polyurethanes and polyureas, with a polyisocyanate crosslinker or by crosslinking a hydroxyl-functional thermoplastic polyurethane elastomer or amine-functional thermoplastic polyurea elastomer, or amine-functional thermoplastic polyamide with a polyisocyanate crosslinker. Nonlimiting examples of polyisocyanate crosslinkers that may be used include 1,2,4-benzene triisocyanate, 1,3,6-hexamethylene triisocyanate, 1,6,11-undecane triisocyanate, bicycloheptane triisocyanate, triphenylmethane-4,4',4"-triisocyanate, isocyanurates of diisocyanates, biurets of diisocyanates, allophanates of diisocyanates, such as any of the diisocyanates already mentioned above.

In another embodiment, the cover includes a crosslinked thermoplastic polyurethane elastomer prepared by crosslinking ethylenically unsaturated bonds located in the hard segments that may be crosslinked by free radical initiation, for example using heat or actinic radiation. The crosslinks may be made through allyl ether side groups provided by forming the thermoplastic polyurethane using an unsaturated diol having two isocyanate-reactive groups, for example primary hydroxyl groups, and at least one allyl ether side group. Nonlimiting examples of such unsaturated diols include those of the formula

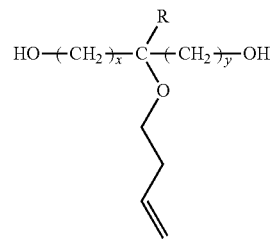

in which R is a substituted or unsubstituted alkyl group and x and y are independently integers of 1 to 4. In one particular embodiment, the unsaturated diol may be trimethylolpropane monoallylether ("TMPME") (CAS no. 682-11-1). TMPME is commercially available, for example from Perstorp Specialty Chemicals AB. Other suitable compounds that may be used as the unsaturated diol may include: 1,3-propanediol, 2-(2-propen-1-yl)-2-[(2-propen-1-yloxy) methyl]; 1,3-propanediol, 2-methyl-2-[(2-propen-1-yloxy) methyl]; 1,3-propanediol, 2,2-bis[(2-propen-1-yloxy) methyl; and 1,3-propanediol, 2-[(2,3-dibromopropoxy) methyl]-2-[(2-propen-1-yloxy)methyl]. The crosslinked polyurethane is prepared by reacting the unsaturated diol, at least one diisocyanate, at least one polymeric polyol having a number average molecular weight of from about 500 and to about 4,000, optionally at least one nonpolymeric reactant with two or more isocyanate-reactive groups (an "extender") that typically has a molecular weight of less than about 450, and a sufficient amount of free radical initiator to generate free radicals that induce crosslinking through addition polymerization of the ethylenically unsaturated groups.

Ethylenic unsaturation may also be introduced after the polyurethane is made, for example by copolymerizing dimethylolpropionic acid then reacting the pendent carboxyl groups with isocyanatoethyl methacrylate, glycidyl methacrylate, glycidyl acrylate, or allyl glycidyl ether.

The amount of unsaturated diol monomer units in the crosslinked thermoplastic polyurethane elastomer may generally be from about 0.1 wt. % to about 25 wt. %. In particular embodiments, the amount of unsaturated diol monomer units in the crosslinked thermoplastic polyurethane elastomer may be about 10 wt. %. Furthermore, the NCO index of the reactants making up the crosslinked thermoplastic polyurethane elastomer may be from about 0.9 to about 1.3. As is generally known, the NCO index is the molar ratio of isocyanate functional groups to active hydrogen containing groups. In particular embodiments, the NCO index may be about 1.0.

Once reacted, the portions of the polymer chain made up of the chain extender and diisocyanate generally align themselves into crystalline domains through weak (i.e., non-covalent) association, such as through Van der Waals forces, dipole-dipole interactions or hydrogen bonding. These portions are commonly referred to as the hard segments because the crystalline structure is harder than the amorphous portions made up of the polymeric polyol segments. The crosslinks formed from addition polymerization of the allyl ether or other ethylenically unsaturated side groups are understood to be in such crystalline domains.

The physical properties of the golf ball materials can be modified by including a filler. Nonlimiting examples of suitable fillers include clay, talc, asbestos, graphite, glass, mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, aluminum, bismuth, nickel, molybdenum, iron, copper, brass, boron, bronze, cobalt, beryllium and alloys of these), metal oxides (such as zinc oxide, iron oxide, aluminum oxide, titanium oxide, magnesium oxide, zirconium oxide and the like), particulate synthetic plastics (such as high molecular weight polyethylene, polystyrene, polyethylene ionomeric resins and the like), particulate carbonaceous materials (such as carbon black, natural bitumen and the like), as well as cotton flock, cellulose flock and/or leather fiber. Nonlimiting examples of heavy-weight fillers that may be used to increase specific gravity include titanium, tungsten, aluminum, bismuth, nickel, molybdenum, iron, steel, lead, copper, brass, boron, boron carbide whiskers, bronze, cobalt, beryllium, zinc, tin, and metal oxides (such as zinc oxide, iron oxide, aluminum oxide, titanium oxide, magnesium oxide, zirconium oxide). Nonlimiting examples of light-weight fillers that may be used to decrease specific gravity include particulate plastics, glass, ceramics, and hollow spheres, regrinds, or foams of these. Fillers that may be used in the core center and core layers of a golf ball are typically in a finely divided form.

The cover may be formulated with a pigment, such as a yellow or white pigment, and in particular a white pigment such as titanium dioxide or zinc oxide. Generally titanium dioxide is used as a white pigment, for example in amounts of from about 0.5 parts by weight or 1 part by weight to about 8 parts by weight or 10 parts by weight passed on 100 parts by weight of polymer. In various embodiments, a white-colored cover may be tinted with a small amount of blue pigment or brightener.

Customary additives can also be included in the golf ball materials, for example dispersants, antioxidants such as phenols, phosphites, and hydrazides, processing aids, surfactants, stabilizers, and so on. The cover may also contain additives such as hindered amine light stabilizers such as piperidines and oxanalides, ultraviolet light absorbers such as benzotriazoles, triazines, and hindered phenols, fluorescent materials and fluorescent brighteners, dyes such as blue dye, and antistatic agents.

The materials may be compounded by conventional methods, such as melt mixing in a single- or twin-screw extruder, a Banbury mixer, an internal mixer, a two-roll mill, or a ribbon mixer. The core or, in the case of a multilayer core, the center and intermediate layer or layers may be formed by usual methods, for example by injection molding and compression molding. The core may be ground to a desired diameter. Grinding can also be used to remove flash, pin marks, and gate marks due to the molding process.

A cover layer is molded over the core. In various embodiments, the third thermoplastic material used to make the cover may preferably include thermoplastic polyurethane elastomers, thermoplastic polyurea elastomers, and the metal cation salts of copolymers of ethylene with ethylenically unsaturated carboxylic acids.

The cover may be formed on the core by injection molding, compression molding, casting, and so on. For example, when the cover is formed by injection molding, a core fabricated beforehand may be set inside a mold, and the cover material may be injected into the mold. The cover is typically molded on the core by injection molding or compression molding. Alternatively, another method that may be used involves pre-molding a pair of half-covers from the cover material by die casting or another molding method, enclosing the core in the half-covers, and compression molding at, for example, between 120° C. and 170° C. for a period of 1 to 5 minutes to attach the cover halves around the core. The core may be surface-treated before the cover is formed over it to increase the adhesion between the core and the cover. Nonlimiting examples of suitable surface preparations include mechanically or chemically abrasion, corona discharge, plasma treatment, or application of an adhesion promoter such as a silane or of an adhesive. The cover typically has a dimple pattern and profile to provide desirable aerodynamic characteristics to the golf ball.

In various embodiments, the material used to make the cover may preferably include thermoplastic polyurethane elastomer, thermoplastic polyurea elastomer, ionomer resin, or combinations of these or thermoset polyurethane elastomer or polyurea elastomer.

The golf balls can be of any size, although the USGA requires that golf balls used in competition have a diameter of at least 1.68 inches (42.672 mm) and a weight of no greater than 1.62 ounces (45.926 g). For play outside of USGA competition, the golf balls can have smaller diameters and be heavier.

After a golf ball has been molded, it may undergo various further processing steps such as buffing, painting and marking. In a particularly preferred embodiment of the invention, the golf ball has a dimple pattern that coverage of 65% or more of the surface. The golf ball typically is coated with a durable, abrasion-resistant and relatively non-yellowing finish coat.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

What is claimed:

1. A golf ball comprising:
   a single-piece core including an ionomeric material, the core having an outer surface that includes:
      a plurality of polygonal land portions aligned on a common sphere; and
      a plurality of grooves separating the polygonal land portions and extending radially inward from the common sphere, each of the grooves having a groove depth in a radial direction relative to the common sphere of about 0.2 to 0.6 mm;
   an intermediate layer surrounding the core and having a radially inward surface bonded to the outer surface of the core, the intermediate layer having a radial thickness of between about 4.0 and 9.0 mm, the intermediate layer and the core defining an intermediate ball; and
   a cover layer surrounding the intermediate layer and defining an outer surface of the golf ball,
   wherein the core has a 10-130 kg compression deformation of between about 3.5 and 5.5 mm, and
   wherein the intermediate ball has a 10-130 kg compression deformation of between about 2.7 and 5.5 mm, the 10-130 kg compression deformation of the intermediate ball being less than the 10-130 kg compression deformation of the core.

2. The golf ball of claim 1, wherein the plurality of polygonal land portions includes:
   a first set of polygonal land portions having three straight edges, a second set of polygonal land portions having four straight edges, and a third set of polygonal land portions having five straight edges.

3. The golf ball of claim 2, wherein the polygonal land portions having four straight edges include rectilinear and non-rectilinear polygonal land portions.

4. The golf ball of claim 2, wherein the polygonal land portions having four straight edges are arranged in annular rows and columns extending circumferentially around the core.

5. The golf ball of claim 4, wherein the polygonal land portions having five straight edges are arranged in quadrants separated by the annular rows and columns of the polygonal land portions having four straight edges.

6. The golf ball of claim 1, wherein the plurality of grooves includes three sets of annular grooves each extending circumferentially about a respective center axis, the three center axes being mutually orthogonal.

7. The golf ball of claim 6, wherein the three sets of annular grooves each includes three or more annular grooves.

8. The golf ball of claim 6, wherein the plurality of grooves includes two or more grooves each extending circumferentially along a non-linear path around the core.

9. The golf ball of claim 1, wherein the polygonal land portions each has a convex or concave surface profile with respect to the common sphere.

10. The golf ball of claim 9, wherein the convex or concave surface profile extends across the entirety of each of the polygonal land portions.

11. The golf ball of claim 1, wherein each of the grooves is at least partially defined by a central portion and two sidewalls, the two sidewalls each having a first rounded edge, which connects the sidewall to at least one of the polygonal land portions, and a second rounded edge, which connects the sidewall to the central portion.

12. The golf ball of claim 1, the first and second rounded edges each having a radius of curvature of between about 0.25 and 2.0 mm.

13. A multi-layer golf ball comprising:
a single-piece spherical core defining an innermost portion of the golf ball, the core being formed, in whole or in part, from an ionomeric material and having a 10-130 kg compression deformation of between about 3.5 and 5.5 mm, the core having an outer surface that includes:
  a plurality of polygonal land portions aligned on a common sphere datum; and
  a plurality of grooves separating the polygonal land portions and extending radially inward from the common sphere datum, each of the grooves having a groove depth in a radial direction relative to the common sphere datum of about 0.2 to 0.6 mm;
an intermediate layer surrounding the core and having a radially inward surface bonded to the outer surface of the core, the radially inward surface including a plurality of protrusions projecting into and filling the grooves of the core, the intermediate layer being formed, in whole or in part, from a rubber material and having a radial thickness of between about 4.0 and 9.0 mm, the intermediate layer and the core defining an intermediate ball; and
a cover layer surrounding the intermediate layer and defining an outermost surface of the multi-layer golf ball,
wherein the intermediate ball has a 10-130 kg compression deformation of between about 2.7 and 5.5 mm, the 10-130 kg compression deformation of the intermediate ball being less than the 10-130 kg compression deformation of the core.

* * * * *